Oct. 7, 1969  W. E. HARRISON ET AL  3,471,863
OSCILLOGRAPH HAVING SEMICONDUCTOR REFLECTIVE MEMBER
Filed Dec. 19, 1967

INVENTOR.
WAYNE E. HARRISON
STEPHEN J. JATRAS
BY
Head & Johnson
ATTORNEYS

United States Patent Office 3,471,863
Patented Oct. 7, 1969

3,471,863
OSCILLOGRAPH HAVING SEMICONDUCTOR REFLECTIVE MEMBER
Wayne E. Harrison and Stephen J. Jatras, Tulsa, Okla., assignors to Midwestern Instruments, Inc., a division of Telex, Inc., Tulsa, Okla., a corporation of Delaware
Filed Dec. 19, 1967, Ser. No. 691,761
Int. Cl. G01d 9/42; G02b 5/00
U.S. Cl. 346—108                4 Claims

ABSTRACT OF THE DISCLOSURE

This invention relates to means for varying the angle of deflection of a reflected electromagnetic beam. More particularly, the invention relates to a means of varying the angle of deflection of a reflected electromagnetic beam comprising a semiconductor member having regions of P-type and N-type conductivity forming an arcuate configured junction therebetween, at least one of the regions being transparent to the electromagnetic beam, means of applying a signal voltage across the P and N-regions to provide an arcuate reflective depletion layer in the transparent region of the semiconductor member spaced from the junction, the spacing of the depletion layer from the junction being responsive to the signal voltage, and means of directing an electromagnetic beam onto the transparent region of the semiconductor member to impinge at an incident angle upon the arcuate reflective depletion layer, at least a portion of the electromagnetic beam being reflected from the depletion layer.

SUMMARY

While the invention relates broadly to a means of varying the angle of deflection of an electromagnetic beam the invention will be described as it is particularly applicable to the use of the invention structure in an oscillograph. Oscillographs are well known devices utilized in military, industrial and medical applications for recording variations of electric voltage signals. In the typical oscillograph in present use a moving record medium is provided, the record medium being sensitive to an electromagnetic beam wherein the point of impingement of the electromagnetic beam is made visually discernable by subsequent development. The usual means of developing an oscillograph record medium is by chemical process wherein the record is subjected to a developing liquid, or a dry process wherein the record is latensified by subjection to heat and light.

The presently used arrangement for directing an electromagnetic beam onto a moving recording medium is by use of a galvanometer.

Galvanometers typically include a small coil of current carrying wire suspended in a magnetic field. A small mirror is arranged for pivotation in response to movement of the coil. The electric voltage signal to be recorded by the oscillograph is impressed across the coil. The magnetic field induced by the signal voltage in the coil reacts with the magnetic field in which the coil is situated causing deflection of the coil, such deflection being imparted to the mirror. A beam from a light source is directed onto the mirror, the beam being reflected off the mirror and onto the recording medium. Proper lens systems are utilized for concentrating the light beams before and after reflection from the mirror to produce accurate visible traces of the varying electric signal voltage on the record medium.

The presently used oscillographs are fully successful and extremely useful tools in industrial, research, military and medical applications. While galvanometer technology has been developed to a skilled science galvanometers nevertheless have certain inherent limitation. Since the reflection of the light beam depends upon physical pivotation of a mirror it is obvious that all galvanometers have an inherent upper writing speed limitation. While the writing speed of galvanometers has been increased by highly developed manufacturing techniques nevertheless any physical arrangement for moving a mirror is inevitably subject to speed limitations. An additional problem with any galvanometer is that it must have a natural period of vibration which is superimposed to some degree upon the record produced. While techniques have been developed for dampening the natural period of vibration of galvanometers and although galvanometers are designed to have an inherent frequency which least interfers with the frequency of the electrical signal to be recorded, nevertheless the fact that galvanometers have a natural frequency of vibration is a characteristic which is usually undesirable and one which is overcome by the arrangement of this invention. Another inherent disadvantage of galvanometers is that they are subject to failure when subjected to excess vibration or gravitational and accelerational forces.

This invention provides a system for varying the angle of deflection of a reflected light beam, particularly useful in oscillographs, in an arrangement using a solid state component. In the application of the invention to oscillographs the beam is reflected on a moving record medium in the same way as is presently utilized in an oscillograph, the invention providing a replacement for the presently used galvanometers and overcoming all of the disadvantages and limitations of galvanometers above enumerated. Particularly, the solid state device of this invention provides means for directing a light beam in an arrangement having substantially unlimited speed capability, having no natural frequency of oscillation, and in a solid state device having a high degree of resistance to vibration, shock, gravitational and accelerational forces.

DESCRIPTION OF VIEWS

DETAILED DESCRIPTION

Figure 1:
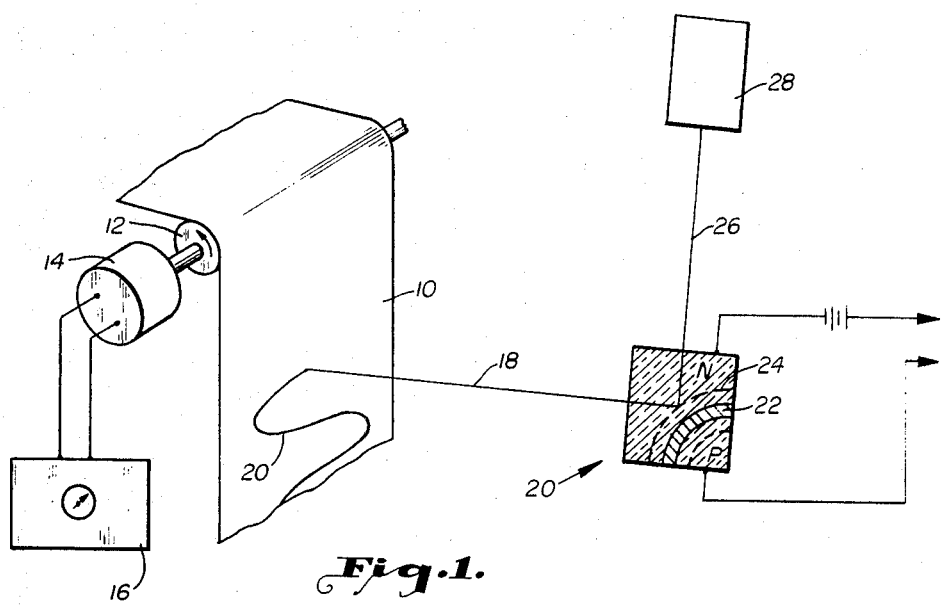
FIGURE 1 is a perspective view of an oscillograph utilizing the principles of this invention.

Referring now to the drawings the invention will be described as it is particularly related to the application thereof for use in an oscillograph. The typical oscillograph includes a record medium 10 which is moved, such as by a roller 12 driven by a motor 14. Motor 14 may be controlled by a variable speed drive device 16.

The record 10 is typically an elongated strip of paper which is chemically treated to respond to the impingement of a beam of electromagnetic energy 18 directed thereon. The energy of beam 18 affects a chemical change in record medium 10 so that following development the point of impingement of the electromagnetic beam is made visually discernable in the form of a trace 20. The trace 20 is a visible record or display of a varying voltage signal. Development of record 10 may be accomplished by chemical treatment following the impression of the electromagnetic beam thereon or the trace 20 may be made visible by latensification achieved by exposure of the treated record medium 10 to heat and/or light.

In the typical oscillograph in use at the present time the electromagnetic beam 18 is directed onto record medium 10 from a moving mirror actuated by a coil suspended in a magnetic field. This invention provides a new means for deflection of electromagnetic beam 18 in response to an electrical signal.

A semiconductor member 20 is provided having regions of P-type and N-type conductivity identified by such letters. The N and P-regions of the semiconductor are separated by a junction 22. Thus the semiconductor member 20 is, in effect, a diode. The junction 22 is of curvilinear configuration and is illustrated as being of the configuration of the segment of a circle.

Either the N or P-regions of the semiconductor diode 20 must be of substantially transparent material. In the illustrated arrangement of FIGURES 1 and 2 the N-region is the one through which the light to be reflected passes and must be of transparent to the frequency of the electromagnetic beam to be reflected. Gallium phosphide, properly doped, is an example of a material transparent to electromagnetic energy in the form of light. The invention may be practiced wherein both the N and P-regions are transparent.

The invention utilizes the fact that the depletion layer of a P-N junction has, for certain materials, a different index of refraction from that of the surrounding semiconducting medium, and the fact that the width of the depletion layer of a P-N junction varies according to the voltage applied across the junction. The variation in width of the depletion layer is particularly pronounced for a reversed biased junction. In the illustrated arrangement of FIGURE 1 the depletion layer configuration in response to a given level of negative bias voltage across the element is indicated by the numeral 24. Since depletion layer 24 has a different index of refraction from that of the surrounding semiconductor medium an electromagnetic beam 26 directed thereon is partially reflected as beam 18.

Figure 2:
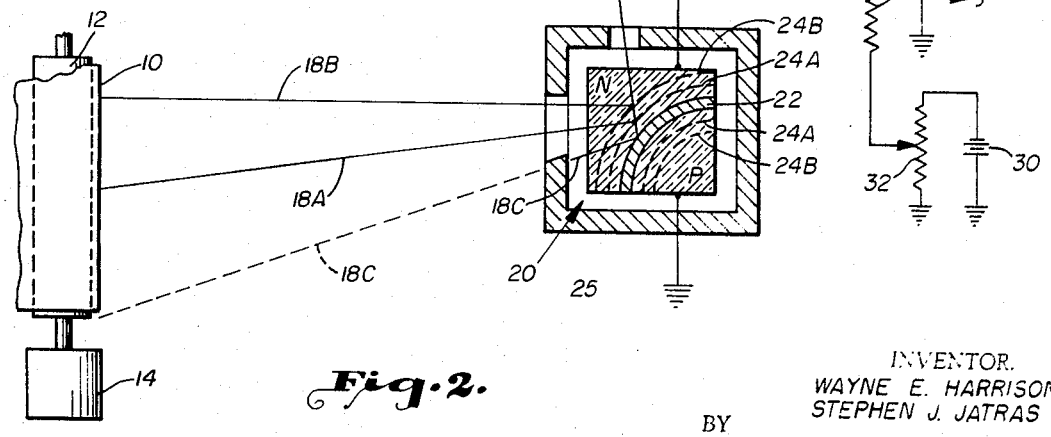
FIGURE 2 is an enlarged and more detailed cross-sectional view of the semiconductor element of the invention shown as used to reflect an electromagnetic beam onto a moving record medium from concave configured depletion layers.

Referring to FIGURE 2 the arrangement of the invention is better illustrated. With no bias voltage applied across the element 20 an electromagnetic beam 26 directed to the semiconductor 20 is partially reflected by the forward face of junction 22, the partially reflected beam being indicated by the numeral 18C. Since the reflection 18C appears either in the absence or presence of an electrical signal it conveys no information relative to the electrical signal to be recorded and in the illustrated embodiment is blocked by a light shield 25. When both the N and P-regions of the semiconductor 20 are transparent a portion of the beam passes directly through the junction 22 and a portion of the beam will be reflected by the rearward face of junction 22. Since this portion of the beam is also not responsive to the signal it is intercepted by the light shield 25 so as not to interfere with the beam impinging upon the record.

A portion of the electromagnetic beam 26 from source 28 is reflected as it intersects the depletion layer 24 paralleling the junction 22. In FIGURE 2 two depletion layers 24A and 24B are illustrated, each of the layers being representative of the geometrical position of the depletion layer in response to two different biasing voltages applied between the N and P regions of the semiconductor. As an example, when the beam 26 strikes depletion layer 24A a beam 18A is reflected onto record 10, the point of impingement being representative of a given bias voltage across the semiconductor. Beam 18A is reflected from the depletion layer 24A at an angle of reflection relative to a tangent to the point of impingement upon the arcuate depletion layer 24A equal to the angle of incidence of beam 26 to such tangent.

In like manner, beam 26 striking depletion layer 24B is reflected at an angle of reflection equal the angle of incidence to a tangent drawn through the point of intersection of the beam 26 on depletion layer 24B. Due to the arcuate configuration the junction 22 and the resulting depletion layer 24 caused by negative bias voltage applied across the semiconductor, the angle of incidence and therefore the angle of reflection varies in response to the bias voltage. Thus it can be seen that the beam 18 of FIGURE 1 strikes the record medium 10 at a position depending upon the displacement of the depletion layer 24 from the junction 22 and since the displacement of the depletion layer is responsive to the voltage applied across the N and P-regions of the semiconductor 20 the position of the point of impingement of beam 18 upon the record medium 10 is representative of the signal voltage applied across the semiconductor, thereby tracing a wave form upon moving record 10 in response to the signal applied across the semiconductor.

Depletion layers are produced to either side of the junction 22 and beam 26 engaging such depletion layers on the convex side of junction 22 will produce reflections, if the P region of semiconductor 20 is transparent, however such reflections will be intercepted by the light shield 25 and will not impinge upon the record 10.

To provide reverse bias a voltage source 30 applies a voltage drop across a potentiometer 32. From the center-tap of potentiometer 32 through a load resistor 34 the bias voltage is applied to the N-region of the semiconductor 20, the P-region being grounded. The signal to be recorded is applied across conductors 36, one of the conductors extending to ground so that the signal voltage is applied across the biased semiconductor. The amount of bias is controlled by potentiometer 32. In the recording of a voltage signal it is normally desirable that the zero voltage signal be directed to an intermediate point on the record 10. By adjustment of potentiometer 32 the bias with zero voltage signal applied can be adjusted so that the depletion layer exists as indicated by the numeral 24A. Thus the beam 18A reflected therefrom can be centered on the record 10.

As an electrical signal is applied across conductors 36 the bias across the semiconductor 20 is altered depending upon whether the signal, at any instant of time, adds or subtracts from the bias voltage. For instance, when the signal applied across conductors 36 is negative with respect to ground the negative voltage is added to the negative bias voltage, causing the depletion layer to be displaced further from the junction 22, as indicated by the numeral 24B. This additional negative bias across the semiconductor causes the angle of reflection of beam 26 to take that indicated by the numeral 18B to impinge upon record 10 at a point spaced from the no voltage signal indicated by the impingement of beam 18A.

When a positive voltage signal is applied across conductors 36 such positive voltage subtracts from the negative bias across the semiconductor so that the depletion layer moves back towards the junction 22 and the point of impingement of the beam moves in the direction of the bias signal indicated by the projection of beam 18C. In practice the bias voltage is selected so that with a maximum positive signal voltage some bias will always exist across the semiconductor and therefore a reflection will always take place at a depletion layer spaced from the junction 22. By this arrangement the reflection will always impinge upon the record 10 and the total character of the signal voltage will be recorded.

Since the disposition of the depletion layer 24 from the junction 22 is instantaneously responsive to the bias voltage across the semiconductor the reflection 18 of beam 26 is likewise instantaneous so that the reflection of the light beam is not limited by any physical movement of apparatus as is the case with the present galvanometer structures utilizing movable mirrors. In addition, it is obvious that no inherent frequency of oscillation of the apparatus exists and since the apparatus utilizes a solid state element it is inherently resistive to the effects of vibration, shock, gravity and acceleration.

The source 28 may be any present known electromagnetic energy generating means including incandescent, fluorescent, or arc lamps or such source may be a laser arrangement. The electromagnetic beam 26 may be either in the visible or invisible spectrum and the record medium 10 may be of any type which is responsive to produce a visible trace of the impingement of an electromagnetic beam thereon, whether the trace is produced subsequent to the impingement of the beam by chemical action, latensification or otherwise.

In the illustrations of FIGURES 1 and 2 the relative displacement of the depletion layers 24 (24A and 24B in FIGURE 2) is shown at an exaggerated distance from the junction 22 for the purposes of more graphically illustrating the means whereby the invention functions.

The total displacement of the point of impingement of beam 18 upon record medium 10 depends upon several factors, including the materials selected for semiconductor 22, the bias voltage applied, the radius of curvature of the junction 22, the point of impingement of electromagnetic beam 26 relative to such radius of curvature, the spacing between the semiconductor, and the record medium and other factors.

While the junction 22 has been described as being of arcuate curvature it is obvious that other curvilinear configurations will function within the scope of the invention.

Figure 3:
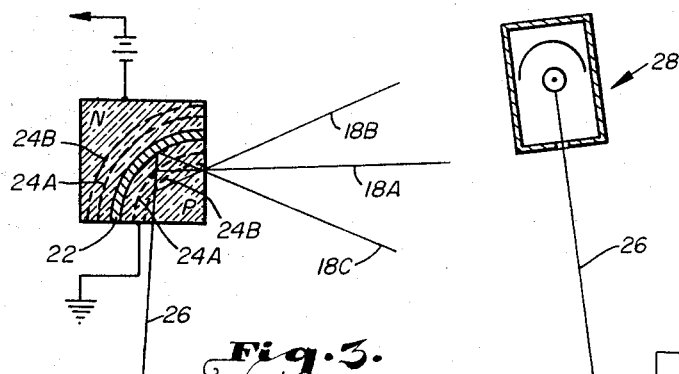
FIGURE 3 is a cross-sectional view of the semiconductor element of the invention showing the element utilized to reflect an electromagnetic beam from convex configured depletion layers.

In FIGURES 1 and 2 the arrangement is shown in which a beam is reflected from variable spaced concave configured depletion layers. As illustrated in FIGURE 3 the same effect may be achieved by reflecting a beam from convex configured depletion layers.

The invention has been described with a certain degree of particularlity and it is manifest that many changes may be made in the details of construction of the arrangements of components as well as the method of practicing the invention without departing from the spirit and scope of this disclosure.

What is claimed:
1. Means of varying the angle of deflection of a reflected electromagnetic beam comprising:
 a semiconductor member having regions of P type and N-type conductivity forming an arcuate configured junction therebetween at least one of said regions being transparent to said electromagnetic beam;
 means of applying a signal voltage across said P and N-regions to produce an arcuate reflective depletion layer in said transparent region of said semiconductor member spaced from said junction, the spacing of said depletion layer from said junction being responsive to said signal voltage; and
 means of directing an electromagnetic beam onto said transparent region of said semiconductor to impinge at an incidence angle upon said arcuate reflective depletion layer, at least a portion of said electromagnetic beam being reflected from said depletion layer.

2. A means of varying the angle of deflection of a reflected electromagnetic beam according to claim 1 including a
 light shield means adjacent said semiconductor member arranged to intercept all electromagnetic radiation from said semiconductor member except said beam reflected from said arcuate depletion layer.

3. An oscillograph for recording a trace representative of a time-varying electrical voltage signal comprising:
 a moving record medium sensitive to record the impingement of an electromagnetic beam thereon;
 a source providing an electromagnetic beam;
 a semiconductor member having regions of P type and N-type conductivity forming an arcuate configured junction therebetween, at least one of said regions being transparent to said electromagnetic beam;
 means of applying a signal voltage across said P and N-regions to produce an arcuate reflective depletion layer in said transparent region of said semiconductor spaced from said junction at a distance responsive to the instantaneous valve of said signal voltage;
 and means of directing said electromagnetic beam onto said transparent region of said semiconductor to impinge at an incidence angle upon said arcuate reflective depletion layer, at least a portion of said electromagnetic beam being reflected from said depletion layer and onto said moving record medium.

4. An oscillograph according to claim 3 including means of applying a variable reverse bias to said junction, said bias being adjustable, and whereby the spacing of said depletion layer when the signal voltage is nil is such that the reflection of said electromagnetic beam therefrom impinges upon said record medium at a point selectable by variation of said bias voltage.

References Cited

UNITED STATES PATENTS

| 2,455,163 | 12/1948 | Harrison | 350—163 |
| 2,920,529 | 1/1960 | Blythe | 350—285 |
| 2,993,403 | 7/1961 | Harries | 346—109 X |
| 3,183,359 | 5/1965 | White | 250—199 |
| 3,301,625 | 1/1967 | Ashkin et al. | 350—150 |

RICHARD B. WILKINSON, Primary Examiner

JOSEPH W. HARTARY, Assistant Examiner

U.S. Cl. X.R.

346—109; 350—160, 295